United States Patent
Sugihara

(10) Patent No.: US 7,568,129 B2
(45) Date of Patent: Jul. 28, 2009

(54) HARD DISK RECORDING APPARATUS

(75) Inventor: Akinobu Sugihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 803 days.

(21) Appl. No.: 11/171,473

(22) Filed: Jul. 1, 2005

(65) Prior Publication Data

US 2006/0010347 A1    Jan. 12, 2006

(30) Foreign Application Priority Data

Jul. 5, 2004    (JP) .................... P. 2004-197870

(51) Int. Cl.
    *G06F 11/00* (2006.01)
(52) U.S. Cl. .................... 714/42; 386/46
(58) Field of Classification Search ............. 714/42
    See application file for complete search history.

(56) References Cited

U.S. PATENT DOCUMENTS

| | | | | |
|---|---|---|---|---|
| 5,631,698 A * | 5/1997 | Lee | | 348/178 |
| 6,401,214 B1 * | 6/2002 | Li | | 714/6 |
| 7,130,532 B2 * | 10/2006 | Nakaya | | 386/125 |
| 7,298,960 B1 * | 11/2007 | Taylor et al. | | 386/46 |
| 2002/0012517 A1 * | 1/2002 | Ichioka et al. | | 386/46 |
| 2002/0092021 A1 * | 7/2002 | Yap et al. | | 725/55 |
| 2008/0094741 A1 * | 4/2008 | Yoshida | | 360/31 |

FOREIGN PATENT DOCUMENTS

| | | |
|---|---|---|
| JP | 2000-100053 | 4/2000 |
| JP | 2000-217063 | 8/2000 |
| JP | 2000-311452 | 11/2000 |
| JP | 2001-265538 | 9/2001 |
| JP | 2003-233511 | 8/2003 |
| JP | 2004-178712 | 6/2004 |

\* cited by examiner

*Primary Examiner*—Scott T Baderman
*Assistant Examiner*—Kamini Patel
(74) *Attorney, Agent, or Firm*—Morgan, Lewis & Bockius LLP

(57) ABSTRACT

A hard disk recording apparatus including: a receiving unit for receiving programs; a reservation data receiving unit for accepting input of reservation recording data including reservation recording starting time; a reservation data storing unit for storing the reservation recording data; a recording unit for recording the programs on a hard disk based on the reservation recording data, and having a self-diagnosis function for detecting the presence or absence of abnormalities of the hard disk; and a control unit for executing the self-diagnosis if the main body is in the standby state and there is a spare time a spare time more than a time required for the self-diagnosis by a next reservation recording starting time, and not executing the self-diagnosis if the main body is not in the standby state or there is not a spare time more than a time required for the self-diagnosis.

5 Claims, 2 Drawing Sheets

HARD DISK RECORDING APPARATUS

BACKGROUND OF THE INVENTION

1. Field of the Invention

The present invention relates to failure prevention of a hard disk recording apparatus for storing and reproducing content data.

2. Description of the Related Art

Generally, an information processing apparatus, such as a personal computer, is provided with a hard disk drive (hereinafter, referred to as a HDD), which is a magnetic storage device serving as a data storage device. The HDD is precision equipment for recording information on a compact disk in a high-density state while rotating the compact disk at a high speed, and also often fails by vibration or impulsion. If the HDD fails, all recorded information cannot be read. Also, when data recorded in the HDD is not backed up, all information is lost, thereby causing a problem.

Therefore, generally, a HDD has been proposed, in which it executes the self-diagnosis on the basis of SMART (Self-Monitoring Analysis and Reporting Technology) information which is condition managing information of the HDD such as the number of damaged sectors, sector numbers of the damaged sector, sector numbers of alternative sectors, a read error ratio, an ON/OFF frequency of a power supply or the like, and has the SMART function for detecting expectable interferences.

When there are abnormalities in SMART information, the HDD having the SMART function outputs SMART errors. Since the SMART errors are outputted when there is a possibility that interferences occur in the HDD, the HDD normally operates at this time. For this reason, when the SMART error is generated, it is possible to prevent the data from being lost by backing up necessary data and replacing the HDD. Therefore, it is possible to protect the data.

In addition, generally, in order to monitor a magnetic storage device of a slave station installed at a remote location, there is provided a condition managing system of a magnetic storage device in which a master station can monitor detailed operating conditions of the magnetic storage device in a slave station by collecting self-analysis information (SMART information) of the slave station and take prevention measures before abnormalities occur in the magnetic storage device (For example, see JP-A-2003-233511).

A hard disk recorder (HDD video recorder), and a hard disk recorder complex machine having a record-typed DVD drive or a video tape recorder have come into wide use as household appliances having a HDD.

These appliances only display error messages when abnormalities are generated on the HDDs during use, and they don't have effective self-diagnosis functions. For this reason, users cannot understand conditions of the appliances until the messages are displayed. Since the appliances are not operated due to the sudden failure of the HDDs, it is not possible to notify the user of the possibilities that interferences occur in advance, and they have disadvantages.

SUMMARY OF THE INVENTION

The present invention has been made to solve the above-mentioned problems and it is an object of the present invention to provide a hard disk recording apparatus capable of managing conditions of a HDD and detecting the failure in advance.

In order to achieve the above-mentioned objects, according to a first aspect of the invention, there is provided a hard disk recording apparatus including: a receiving unit for receiving programs on the air; a reservation data receiving unit for accepting input of reservation recording data including a reservation recording starting time; a reservation data storing unit for storing the reservation recording data received by the reservation data receiving unit; a recording unit for recording the programs received by the receiving unit on a hard disk on the basis of the reservation recording data stored by the reservation data storing unit, and having a self-diagnosis function for detecting the presence or absence of abnormalities of the hard disk; and a control unit for executing the self-diagnosis in the recording unit if the main body is in the standby state and there is a spare time more than a time required for the self-diagnosis by a next reservation recording starting time, when the current time timed by a timer built in the main body becomes the self-diagnosis starting time, and not executing the self-diagnosis in the recording unit if the main body is not in the standby state or there is not a spare time more than a time required for the self-diagnosis by the next reservation recording starting time.

In this construction, when the current time timed by a timer built in the main body becomes the self-diagnosis starting time, a hard disk recording apparatus executes the self-diagnosis in the recording unit if the main body is in the standby state and there is a spare time more than a time taken for the self-diagnosis by the next reservation recording starting time, and doesn't execute the self-diagnosis in the recording unit if the main body is not in the standby state or there is not a spare time more than a time taken for the self-diagnosis by the next reservation recording starting time. Therefore, when there is not a spare time more than the time taken for the self-diagnosis of the hard disk, the reservation recording is performed without executing the self-diagnosis, so that it is possible to execute the recording without causing problems. In addition, when there is a spare time required for the self-diagnosis of the hard disk, the self-diagnosis is surely executed, so that it is possible to understand whether the abnormalities occur on the had disk.

According to a second aspect of the invention, the hard disk recording apparatus further includes a standby state setting unit for setting and canceling the standby state of the main body. Also, when canceling the standby state of the main body during the self-diagnosis of the recording unit, the control unit stops the self-diagnosis.

In this construction, if the standby state of the main body is cancelled during the self-diagnosis of the recording unit, the self-diagnosis of the hard disk is stopped, so that users can immediately use the hard disk recording apparatus in the case of use.

According to a third aspect of the invention, the hard disk recording apparatus further includes a standby time storing unit for storing data of a period of time for which the main body is in the standby state by an amount of data corresponding to a predetermined period, and the control unit sets the self-diagnosis starting time on the basis of the data stored by the standby time storing unit.

In this construction, the hard disk recording apparatus sets the self-diagnosis starting time on the basis of the data corresponding to a predetermined period in a period of time for which the main body is in the standby state, stored by the standby time storing unit. Therefore, users can set executing the self-diagnosis of the hard disk in the period of time in which users doesn't use the hard disk recording apparatus, and use the hard disk recording apparatus without paying attention to executing the self-diagnosis of the hard disk.

According to a fourth aspect of the invention, the control unit stops the self-diagnosis if the standby state of the main body is cancelled during the self-diagnosis of the recording unit, and resets the self-diagnosis starting time on the basis of the data stored by the standby time storing unit.

In this construction, if the standby state is cancelled during the self-diagnosis of the recording unit, the control unit resets the self-diagnosis starting time on the basis of the data stored by the standby time storing unit. Therefore, users can use the hard disk recording apparatus without paying attention to executing the self-diagnosis of the hard disk.

According to the hard disk recording apparatus of the present invention, since the user understands a condition of the HDD by executing the self-diagnosis of the HDD on a regular interval, it is possible to notify the user of the possibilities that interferences occur in advance and take prevention measures before the failure of the HDD. Furthermore, since the hard disk recording apparatus according to the present invention can select the time when users doesn't use the apparatus to set executing the self-diagnosis, the hard disk recording apparatus can automatically execute the self-diagnosis without setting the self-diagnosis of the hard disk recording apparatus by users.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
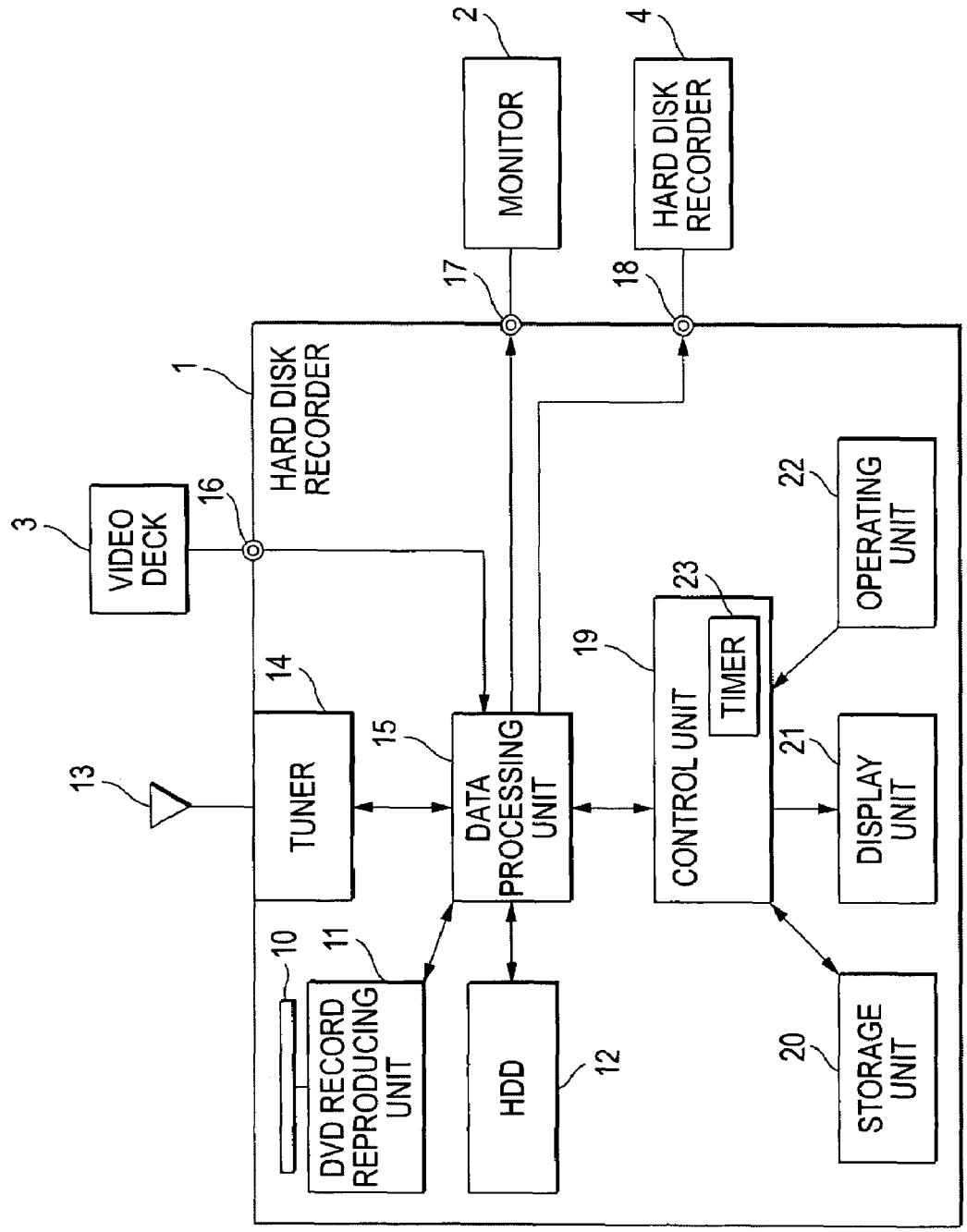
FIG. 1 is a block diagram schematically showing the structure of an optical disk recording apparatus according to an embodiment of the present invention.

FIG. 1 is a block diagram schematically showing the structure of an optical disk recording apparatus according to an embodiment of the present invention. A hard disk recorder 1, which is a hard disk recording apparatus having a built-in DVD drive, includes a DVD record reproducing unit 11, a HDD (hard disk drive) 12, a tuner 14 connected to an antenna 13, a data processing unit 15, an input terminal 16, output terminals 17 and 18, a control unit 19, a storage unit 20, a display unit 21, and an operating unit 22. The DVD record reproducing unit 11 includes an optical pickup element having a laser element, an actuator, a servo circuit, and the like, which are not shown. The DVD record reproducing unit 11 records data on a writable DVD 10 called DVD-R or DVD-RW, and reads the data recorded on the regenerating or writable DVD 10. The HDD 12 stores a television program received by the tuner 14, and video data and audio data which is the content outputted from other video output devices through the input terminal 16.

The tuner 14 receives broadcasting of a channel selected by the operating unit 22 through the antenna 13, and outputs video and audio data of the currently broadcasted program to the data processing unit 15.

The data processing unit 15 outputs content data including the video and audio data transmitted from the tuner 14 or the input terminal 16 to the HDD 12. In addition, the data processing unit 15 outputs content data outputted from the DVD record reproducing unit 11 and content data read from the HDD 12 to the DVD record reproducing unit 11 or the output terminals 17 and 18. The input terminal 16 is a terminal which is connected to another video output device and which inputs the video data and audio data of the content outputted from another video output device to the data processing unit 15. FIG. 1 shows an example in which a video deck 3 is connected to the input terminal 16.

The output terminal 17 is a terminal for outputting the image data and the audio data outputted from the data processing unit 15 to a monitor 2 having one end connected to the output terminal 17.

The output terminal 18 is a terminal for outputting the image data and the audio data outputted from the data processing unit 15 to the video recording device having one end connected to the output terminal 18. FIG. 1 shows an example in which a hard disk recorder 4 is connected to the input terminal 16.

The control unit 19 controls each unit of the hard disk recorder 1. Further, the control unit 19 has a timer 23 for timing current date and time, a day of the week, and time.

The storage unit 20 stores a program or the like to be executed in the firmware and the hard disk recorder 1. The display unit 21 displays messages to be transmitted to a user using letters or images. The operating unit 22 accepts the operations such as, setting of the program to be stored on the HDD 12, setting at the time of recording the data to the DVD-R 10 from the HDD 12, setting of the channel to be received at the tuner 14 or the like, and outputs the signals according to the operation to the control unit 19.

Next, a normal function of the hard disk recorder 1 will be described. The hard disk recorder 1 can store the data, which includes a television program received at the tuner 14 and a content outputted from the video reproducing device connected to the input terminal 16, on the HDD 12. In addition, the hard disk recorder 1 can record the data of the content, such as a television program stored on the HDD 12, on the writable DVD 10. Furthermore, the hard disk recorder 1 can display the content such as a television program stored on the HDD 12, the content recorded on the writable DVD 10, and the content such as the television program received at the tuner 14, on the monitor 17 connected to the output terminal 17. In addition, the hard disk recorder 1 can execute the reservation recording of the program on the basis of EPG received at the tuner 14.

Next, a self-diagnosis function of the HDD 12 of the hard disk recorder 1 will be described. The hard disk recorder 1 has a function for executing the self-diagnosis of the HDD 12 on a regular interval.

Here, the HDD 12 may be a HDD having the self-diagnosis function, and may be, for example, an HDD having an SMART function. In addition, in this case, the HDD 12 may be set such that it executes an "SMART execute Offline immediate" command as a self-diagnosis command. When executing the self-diagnosis according to "the SMART execute Offline immediate" command, the HDD 12 checks up the entire region of the disk. For this reason, the checking time required for performing the self-diagnosis is different depending on the capacity of the disk. For example, it takes about fifty minutes to check up the entire region of an HDD having the capacity of 80 gigabytes.

The hard disk recorder 1 may be set such that it automatically determinates when is a time the user desires or when is the time the frequency of user's use is the least and executes the self-diagnosis on a regular interval. When the hard disk recorder 1 is set to execute the self-diagnosis on a regular interval at the time when the user desires, the user may operate the operating unit 22 to input the desired time and a self-diagnosis executing cycle. In this way, the hard disk recorder 1 executes the self-diagnosis of the HDD 12 on a regular interval. In the hard disk recorder 1, it is possible to set any period as the self-diagnosis executing cycle. However, for example, when the usage frequency of the hard disk recorder 1 is high, that is, the hard disk recorder 1 is used every day, it may be set to execute the self-diagnosis every one or two weeks. In addition, when the usage frequency of the hard disk recorder 1 is low, that is, the hard disk recorder 1 is used once or twice a week, it may be set to execute the self-diagnosis every one or two months. In this way, it is possible to notify the user of whether there is a possibility in which a failure occurs at the HDD 12 in accordance with the frequency of use of the hard disk recorder 1.

Further, the hard disk recorder 1 has a function for counting data for the user's usage, and records the time when the user executes the reservation recording, and the period of time for which the HDD 12 or the DVD record reproducing unit 11 is used. When the user doesn't set the self-diagnosis starting time, the hard disk recorder 1 has an automatic setting function to execute the self-diagnosis of the HDD 12 on a regular interval during the period of time for which the frequency of user's usage is the least on the basis of counted data for the user's usage.

When the user doesn't set the self-diagnosis starting time, first the hard disk recorder 1 counts the data for the user's usage for one week from the beginning of the usage, and sets executing the self-diagnosis of the HDD 12 every week at the time for which the frequency of user's usage is the least on the basis of counted data for the user's usage. In addition, the hard disk recorder 1 additionally counts the data for the user's use, and sets the self-diagnosis executing cycle and time on the basis of the data for the user's usage for one month from the beginning of the use. For example, when the usage frequency of the hard disk recorder 1 is high, for example, the hard disk recorder 1 is used every day, it is set to execute the self-diagnosis every week Also, the hard disk recorder 1 is set to execute the self-diagnosis at the period of time for which the user doesn't use the hard disk recorder 1, such as the period of time for which the user executes the reservation recording of the program, the period of time for which the program recorded on the HDD 12 is reproduced, and the period of time for which the program is recorded or reproduced on the DVD.

Moreover, the hard disk recorder 1 continuously counts the data for the user's usage and conducts a review of the self-diagnosis executing cycle and time on a regular interval (for example, every month). Accordingly, the hard disk recorder 1 is set to execute the self-diagnosis at a day of week and the period of time for the frequency of use is the least.

The hard disk recorder 1 is set to become automatically a standby state when the self-diagnosis is finished. When the abnormality is not detected by the self-diagnosis (a normal case), the hard disk recorder 1 stores the result of the self-diagnosis together with information related to the checking date and time on the storage unit 20, and enters into the standby state. Meanwhile, when the abnormality is detected by the self-diagnosis, the hard disk recorder 1 enters into the standby state in a state in which the result of the self-diagnosis is stored on the storage unit 20 together with the information related to the checking date and time, similar to a normal case. When a power switch of the operating unit 22 is operated, the control unit 19 displays the result of the self-diagnosis on the display unit 21 and allows the result of the self-diagnosis to be displayed on the monitor 2 by outputting the signal to the output terminal 17 from the data processing unit 15. In this step, since the HDD 12 is normally operated even if there is a possibility in which a failure occurs on the HDD 12, as shown in FIG. 1, the backup of the HDD 12 is executed by connecting an input terminal of the hard disk recorder 4 to the output terminal 18. As a result, it can be prevented in advance that having access to the data recorded on the HDD 12 is not possible due to the failure of the HDD 12.

Even though the hard disk recorder 1 executes the self-diagnosis at the time when the user desires or the period of time for which the frequency of use is the least as described above, the time when the user reserves the recording of the program and the time when the self-diagnosis is executed can overlap each other. Further, the period of time for which the hard disk recorder 1 executes the self-diagnosis and the period of time for which the user uses the hard disk recorder 1 can overlap each other. In this case, the control unit 19 of the hard disk recorder 1 stops executing the self-diagnosis and changes the self-diagnosis executing time to another time just before the self-diagnosis is executed or during the self-diagnosis.

In a case in which the self-diagnosis executing time period is changed, when the user sets the reservation time or operates the power switch of the operating unit 22, the control unit 19 displays display for urging setting the self-diagnosis executing time on the display unit 21 and the monitor 2 by the outputting the signal to the output terminal 17 from the display unit 21 and the data processing unit 15. If the new self-diagnosis executing time is set by operating the operating unit 22, the control unit 19 executes the self-diagnosis in the new self-diagnosis executing time period.

Furthermore, in a case in which the recording is reserved or the power switch is operated for the self-diagnosis executing time period, if being set previously such that the self-diagnosis executing time period is automatically set again, the control unit 19 sets the self-diagnosis executing time again on the basis of the counted data for the user's usage. That is, if the reservation recording is executed, the control unit 19 confirms the self-diagnosis executing time period. In this case, when the reservation recording time and the self-diagnosis executing time period overlap each other, the control unit 19 selects a day of the week and the time period the closest to the self-diagnosis executing time period for which the frequency of user's use is the least on the basis of the counted data for the user's usage, and then the control unit 19 sets executing the self-diagnosis in the selected time period. In this way, it is possible to early detect the abnormality of the HDD 12 even if the self-diagnosis of the HDD 12 is suspended.

Since the hard disk recorder 1 has the above-mentioned functions, it is possible to execute the self-diagnosis of the HDD 12 in the time desired by the user. In addition, when the user doesn't set the self-diagnosis executing time, the hard disk recorder 1 executes the time setting to execute the self-diagnosis in the period of time for which the frequency of user's use is the least by counting the data for the user's usage. Therefore, even if the user forgets executing the self-diagnosis of the HDD 12, it is possible to execute the self-diagnosis.

Further, when the reservation recording time overlaps the self-diagnosis executing time period and a power is applied in the self-diagnosis executing time period, the hard disk recorder 1 changes the self-diagnosis executing time period. Therefore, the user can freely use the hard disk recorder 1 without paying attention to the self-diagnosis of the HDD 12.

Figure 2:
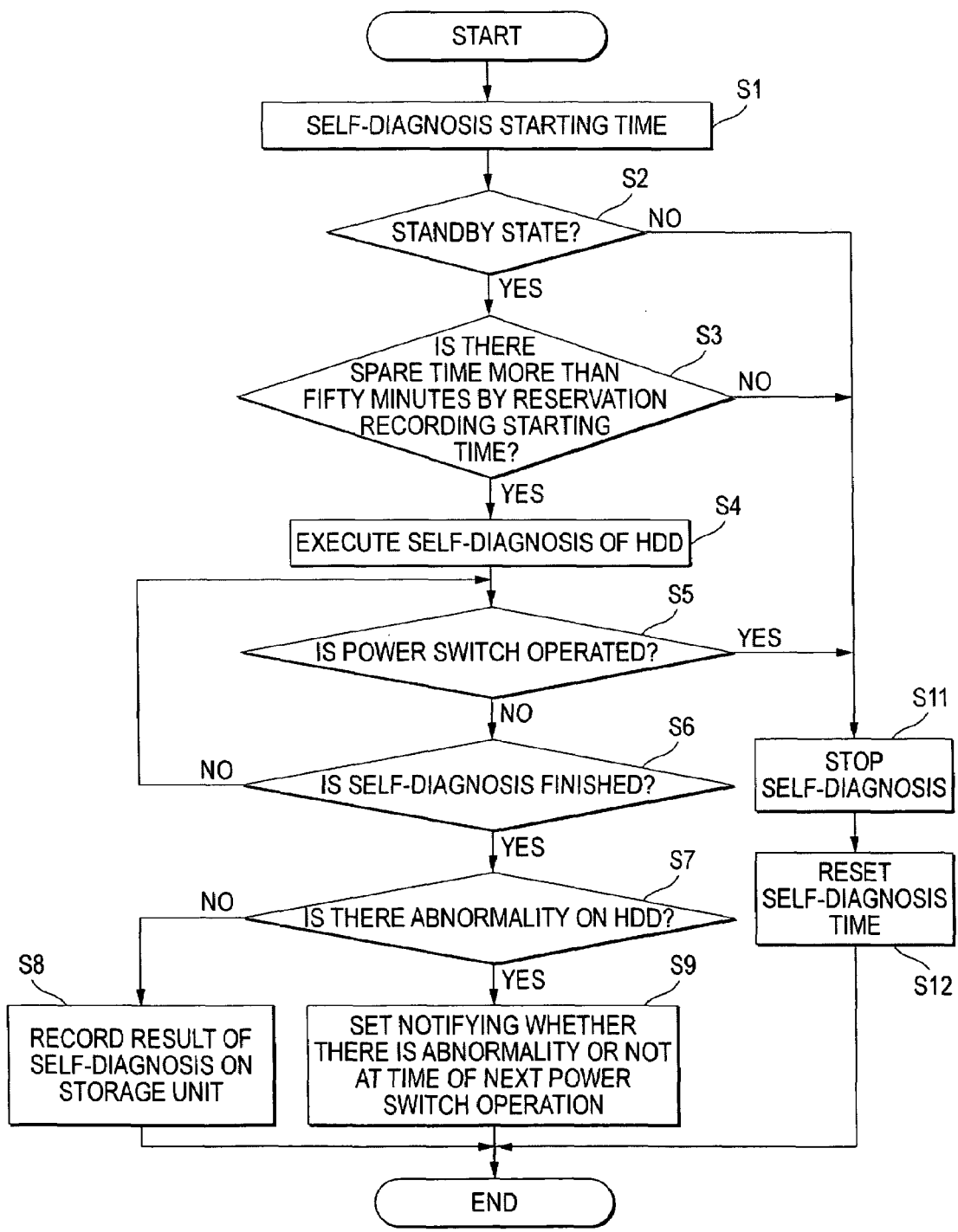
FIG. 2 is a flow chart illustrating a process at the time of self-diagnosis of the optical disk recording apparatus.

Next, a process at the time of the self-diagnosis of the hard disk recorder 1 will be described with reference to a flow chart. FIG. 2 is a flow chart illustrating the process at the time of the self-diagnosis of the optical disk recording apparatus.

In the hard disk recorder 1, the self-diagnosis starting time is set by a user in advance or is automatically set on the basis of the data for the user's usage. Furthermore, the self-diagnosis executing time of the HDD 12 is set as fifty minutes.

When becoming the self-diagnosis starting time (s1), first, the control unit 19 of the hard disk recorder 1 confirms the state of the main body. In other words, the control unit 19 confirms' whether it is the standby state or not (s2), and whether there is a spare time more than fifty minutes by the reservation recording starting time (s3). In addition, when the control unit 19 is not in the standby state and when there is not a spare time more than fifty minutes by the reservation recording starting time, the control unit 19 stops the self-diagnosis (s11) and automatically resets the self-diagnosis starting time on the basis of the data for the user's usage (s12). Then, the self-diagnosis is finished.

Meanwhile, when the main body is in the standby state and when there is a spare time more than fifty minutes by the reservation recording starting time, the control unit 19 allows the self-diagnosis of the HDD 12 to be started (s4).

When it is detected that the power switch of the operation unit 22 is operated during the self-diagnosis (s5), the control unit 19 executes processes subsequent to a step s11. In addition, when the power switch of the operation unit 22 is not operated during the self-diagnosis, the control unit 19 performs the process continuously by the check (self-diagnosis) for the entire region of the HDD 12 is finished (s4 to s6).

If the self-diagnosis of the HDD 12 is finished, in a case in which the abnormality is not detected during the self-diagnosis (normal case), the control unit 19 stores the result of the self-diagnosis together with the information related to the checking date and time on the storage unit 20 and enters into the standby state (s8), and then the process is finished. Meanwhile, when the abnormality is detected during the self-diagnosis in the step s19, the control unit 19 stores the result of the self-diagnosis together with the information related to the checking date and time on the storage unit 20, similar to the normal case. Further, when the power switch of the operation unit 22 is activated by the operation, the control unit 19 allows the result of the self-diagnosis to be displayed on the display unit 21 and sets displaying the result of the self-diagnosis on the monitor 2 by outputting the signal to the output terminal 17 from the data processing unit 15. Then, the control unit 19 enters into the standby state (s9) and the process is finished.

As described above, the hard disk recorder 1 according to the embodiment of the present invention can execute the self-diagnosis of the HDD 12 at the time desired by the user. Furthermore, when the user doesn't set the self-diagnosis starting time, the hard disk recorder 1 sets the time so as to execute the self-diagnosis at the time when which the frequency of user's use is the least by counting the data for the user's usage. Therefore, even if the user forgets executing the self-diagnosis of the HDD 12, it is possible to execute the self-diagnosis. Additionally, when the reservation recording time overlaps the self-diagnosis executing time period and a power is applied in the self-diagnosis executing time period, the hard disk recorder 1 changes the self-diagnosis executing time period. Therefore, the user can freely use the hard disk recorder 1 without paying attention to the self-diagnosis of the HDD 12.

[FIG. 1]
1: HARD DISK RECORDER
2: MONITOR
3: VIDEO DECK
4: HARD DISK RECORDER
11: DVD RECORD REPRODUCING UNIT
12: HDD
14: TUNER
15: DATA PROCESSING UNIT
19: CONTROL UNIT
20: STORAGE UNIT
21: DISPLAY UNIT
22: OPERATING UNIT
23: TIMER

[FIG. 2]
S1: SELF-DIAGNOSIS STARTING TIME
S2: STANDBY STATE?
S3: IS THERE SPARE TIME MORE THAN FIFTY MINUTES BY RESERVATION RECORDING STARTING TIME
S4: EXECUTE SELF-DIAGNOSIS OF HDD
S5: IS POWER SWITCH OPERATED?
S6: IS SELF-DIAGNOSIS FINISHED?
S7: IS THERE ABNORMALITY ON HDD
S8: RECORD RESULT OF SELF-DIAGNOSIS ON STORAGE UNIT
S9: SET NOTIFYING WHETHER THERE IS ABNORMALITY OR NOT AT THE TIME OF NEXT POWER SWITCH OPERATION
S11: STOP SELF-DIAGNOSIS
S12: RESET SELF-DIAGNOSIS TIME

What is claimed is:

1. A hard disk recording apparatus comprising:
a receiving unit for receiving broadcasts;
a reservation data receiving unit for accepting input of reservation recording data including a reservation recording starting time;
a reservation data storing unit for storing the reservation recording data received by the reservation data receiving unit;
a recording unit for recording the broadcasts received by the receiving unit on a hard disk based on the reservation recording data stored by the reservation data storing unit, and having a self-diagnosis function for detecting the presence or absence of abnormalities of the hard disk;
a standby state setting unit for setting and canceling a standby state of a main body;
a standby time storing unit for storing data of a period of time for which the main body is in the standby state by an amount of data corresponding to a predetermined period; and
a control unit for executing the self-diagnosis in the recording unit if the main body is in the standby state and there is a spare time more than a time required for the self-diagnosis by a next reservation recording starting time, when the current time timed by a timer built in the main body becomes the self-diagnosis starting time, for not executing the self-diagnosis in the recording unit if the main body is not in the standby state or there is not a spare time more than a time required for the self-diagnosis by the next reservation recording starting time, and for stopping the self-diagnosis to reset the self-diagnosis starting time on the basis of the data stored by the standby time storing unit and setting the self-diagnosis starting time on the basis of the data stored by the standby time storing unit if the standby state of the main body is cancelled during the self-diagnosis of the recording unit.

2. A hard disk recording apparatus comprising:
a receiving unit for receiving broadcasts;
a reservation data receiving unit for accepting input of reservation recording data including reservation recording starting time;
a reservation data storing unit for storing the reservation recording data received by the reservation data receiving unit;

a recording unit for recording the broadcasts received by the receiving unit on a hard disk on the basis of the reservation recording data stored by the reservation data storing unit, and having a self-diagnosis function for detecting the presence or absence of abnormalities of the hard disk; and a control unit for executing the self-diagnosis in the recording unit if the main body is in the standby state and there is a spare time more than a time required for the self-diagnosis by a next reservation recording starting time, when the current time timed by a timer built in the main body becomes the self-diagnosis starting time, and not executing the self-diagnosis in the recording unit if the main body is not in the standby state or there is not a spare time more than a time required for the self-diagnosis by the next reservation recording starting time.

3. The hard disk recording apparatus according to claim 2, further comprising:

a standby state setting unit for setting and canceling the standby state of the main body;

wherein the control unit stops the self-diagnosis if the standby state of the main body is cancelled during the self-diagnosis of the recording unit.

4. The hard disk recording apparatus according to claim 2, further comprising:

a standby time storing unit for storing data of a period of time for which the main body is in the standby state for a predetermined time;

wherein the control unit sets the self-diagnosis starting time on the basis of the data stored by the standby time storing unit.

5. The hard disk recording apparatus according to claim 4, wherein the control unit stops the self-diagnosis and resets the self-diagnosis starting time on the basis of the data stored by the standby time storing unit, if the standby state is cancelled during the self-diagnosis of the recording unit.

* * * * *